Oct. 6, 1925.

L. R. RAVEL 1,556,028

CONSTRUCTION OF MOTOR VEHICLES

Filed May 12, 1923   2 Sheets-Sheet 1

Inventor
L. R. Ravel
By Marks & Clerk
Attys.

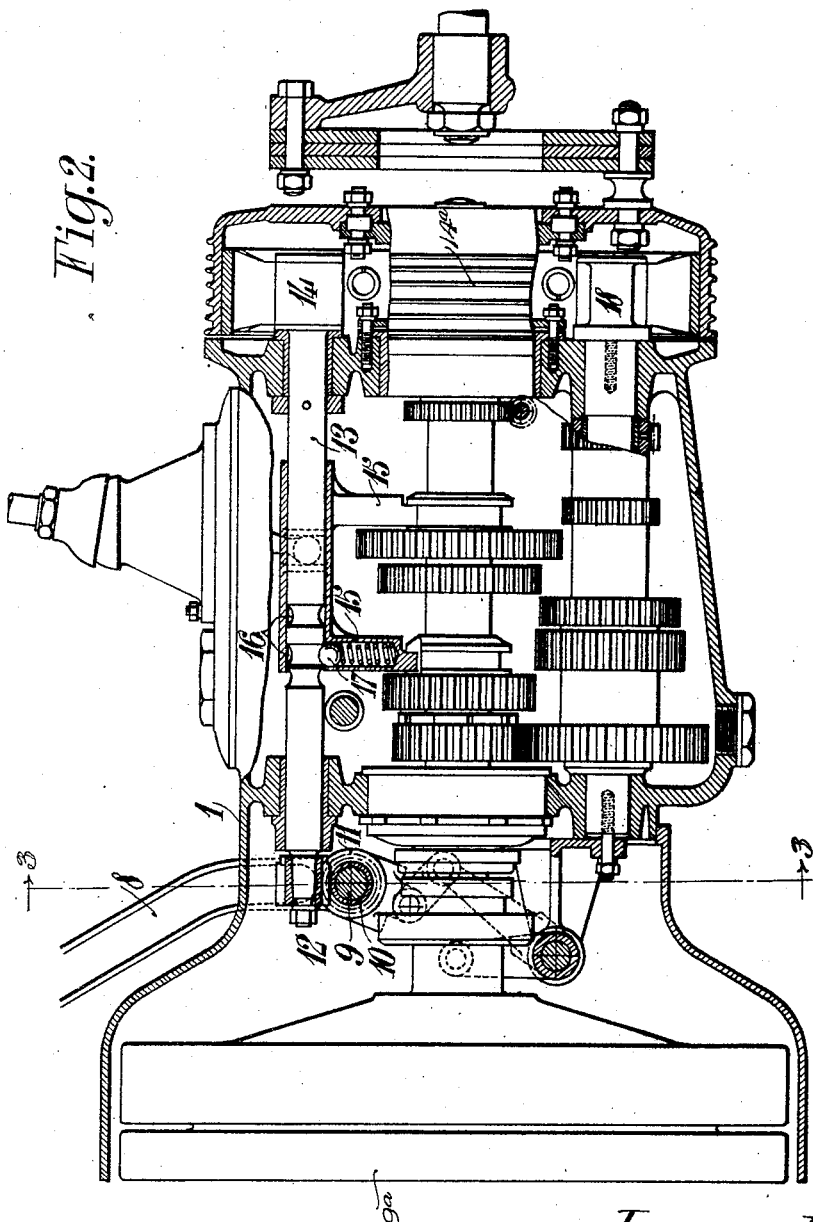

Patented Oct. 6, 1925.

1,556,028

UNITED STATES PATENT OFFICE.

LOUIS RAPHAËL RAVEL, OF BESANCON, FRANCE.

CONSTRUCTION OF MOTOR VEHICLES.

Application filed May 12, 1923. Serial No. 638,614.

*To all whom it may concern:*

Be it known that I, LOUIS RAPHAËL RAVEL, a citizen of the French Republic, residing 9 Rue Eugene Savoye, Besancon, Doubs, France, have invented new and useful Improvements in the Construction of Motor Vehicles, of which the following is the specification.

This invention relates to improvements in motor vehicles and more particularly to a novel mechanism for actuating a transmission and front wheel brake.

The primary object of the invention is to provide a mechanism whereby the movement of a pedal or the like, will cause first a braking effect on the transmnssion mechanism and subsequently a reduced braking effect on the front wheels of the vehicle.

With the foregoing object outlined and with other objects in view which will appear as the description proceeds, the invention consists in the novel features hereinafter described in detail, illustrated in the accompanying drawings and more particularly pointed out in the appended claims.

Referring to the drawings:

Fig. 2 is a longitudinal sectional view of the transmission mechanism of the same with my brake mechanism applied thereto.

Figure 1:
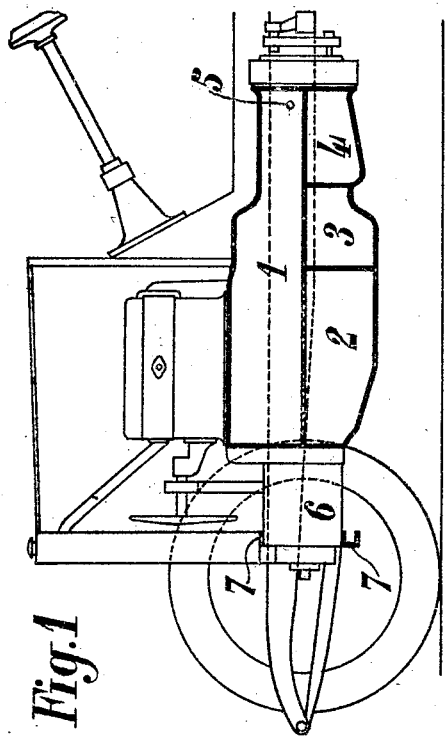
Fig. 1 is a side view of the front portion of a motor vehicle partly in section, and illustrating the casing employed with the invention.

In the drawings, 1 designates an upper casing which may form the upper half of the engine crank shaft casing, the clutch casing and the transmission casing. A lower casing 2 is connected to the part 1 and arranged beneath the engine. A lower half casing 3 forms the bottom of the clutch case and a lower half casing 4 forms the bottom of the transmission mechanism casing. The part 1 may be supported by a transverse shaft or the like 5 and a tubular longitudinal member 6 which rests on the front axle 7.

Figure 3:
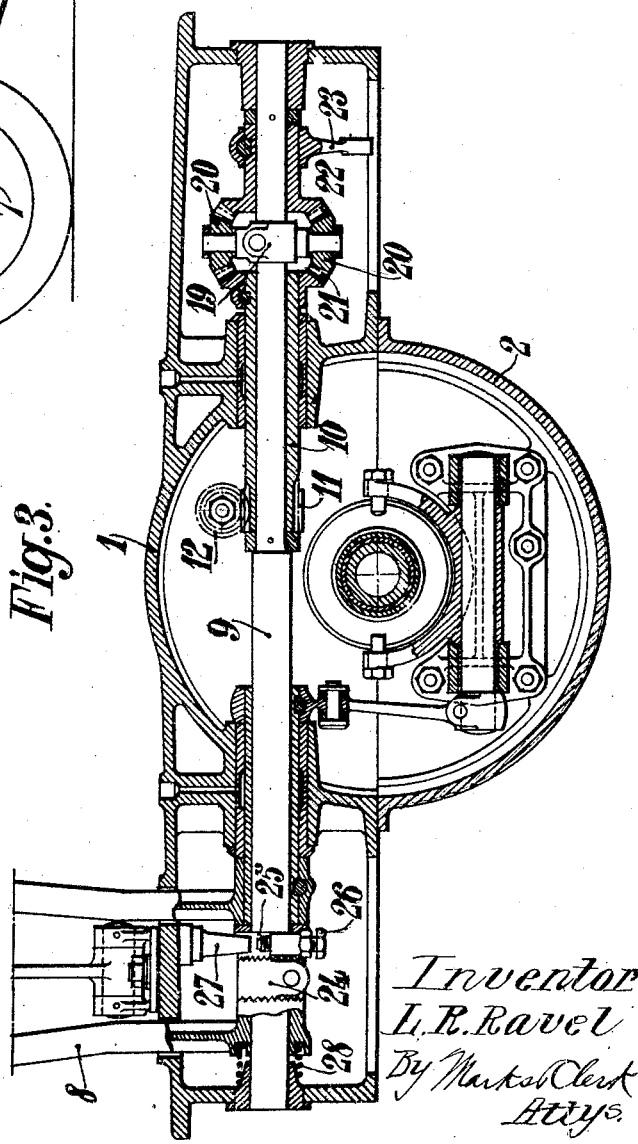
Fig. 3 is a transverse vertical sectional view taken on the line 3—3 of Fig. 2.

The present mechanism was devised with a view of eliminating the rear wheel brakes and to this end the brake mechanism has been designed in such manner that, by means of a single operating member (pedal for instance), it is possible to first brake the transmission mechanism and to subsequently brake the front wheels. The braking therefore takes place in two successive stages. For this purpose, use is made of the gear casing 1 to support and house the brake controlling mechanism, shown in Figs. 2 and 3. Referring to these figures, the brake pedal 8, operates a transverse shaft 9, which latter serves as a guide or bearing for the control mechanism of the clutch 9$^a$. The shaft 9 carries a sleeve 10 provided with a worm pinion 11, which meshes with a worm gear 12, that actuates a shaft 13 provided with a rigidly connected cam 14, used to operate the brake 14$^a$ of the transmission mechanism.

It is to be noted that this brake controlled shaft 13, serves also as a guide for the forks 15, which actuate the sliding pinions of the transmission mechanism. This shaft is provided with grooves 16 which cooperate with spring pressed balls 17 to lock the forks 15 in various positions. The balls are mounted in the forks 15 to provide a convenient arrangement. The reverse pinion shaft of the transmission mechanism has an extension 18 which functions as the pintle for the hinged jaws of the brake 14$^a$.

The shaft 9 (see Fig. 3) is extended to form a support for a spider 19 which carries the pinions 20 of a differential gear. One of the planet gears 21 of the differential is rigidly secured on the sleeve 10, while the other planet gear 22 has a hub pivotally mounted on the shaft 9 and provided with an arm 23, that is adapted to be connected to the link which extends to the front wheel brakes.

The control is effected in the following manner:

First—braking of the transimission. By acting on the pedal 8, an angular movement is transmitted to the shaft 9 and to the spider 19 of the differential mechanism, said spider being fixed to said shaft 9. As a result, the pinions 20 rotate about their axes on account of the planet gear 22 being stationary at this time. This movement causes the planet gear 21, which actuates the sleeve 10, to turn. Consequently, the shaft 13 is turned and this causes the cam 14 to act on the brake shoes and effect the braking of the transmission mechanism.

Second—braking of the front wheels. When the brake on the transmission is applied, the movement of the shaft 13 is halted and this also stops the movement of the shaft 13 and causes the worm gear 12 to lock the gear 11, sleeve 10 and planet gear 21. Consequently the further movement transmitted to the spider 19 by the pedal 8, causes the gears 20 to rotate on the gear 21 and this causes rotation of the planet gear 22, so that the arm 23 is actuated to apply the front wheel brakes.

The control pedal 8 is not rigidly mounted on the shaft 9, but instead is loosely mounted on this shaft, and one edge of its hub is provided with ratchet teeth, which engage similar teeth on a sleeve 24 that is rigidly mounted on the shaft 9. The other edge of the sleeve is also provided with ratchet teeth which mesh with similar teeth on a second sleeve 25 that is loosely mounted on the shaft 9 and carries adjustable stops 26 which may contact with fixed abutments 27 on the gear casing. The engagement of the ratchet teeth of the pedal 8 with the sleeve 24 is obtained by a spring 28 which bears at one side against the pedal 8 and at its other side against the gear casing.

When, owing to wear in the transmission, the pedal 8 does not have a sufficient stroke to properly apply the brakes, this condition may be remedied by pressing the pedal 8 to cause one of the stops 28 to contact with the corresponding abutment 27, then the pedal 8 may be drawn backward, until it is again rigidly fixed relatively to the shaft 9. This adjustment is easily effected, since the ratchet teeth may slide relatively to each other by compressing the spring 28, and this allows temporary disengagement of the teeth. As soon as the pedal 8 is released, the spring 28 relaxes and locks the pedal to the sleeve 24, which sleeve as before stated, is rigid with the shaft 9.

From the foregoing, it is believed that the construction, operation and advantages of the invention may be readily understood by those skilled in the art, and I am aware that changes may be made without departing from the spirit of the invention as expressed in the claims.

What I claim and desire to secure by Letters-Patent is:

1. In a motor vehicle, an upper casing forming the upper part of the crank case and transmission case, a lever operated shaft journaled in said casing, a transmission mechanism provided with a transmission brake, means for actuating the brake from said shaft, a front wheel brake actuating member, and a differential mechanism between said member and the transmission brake, whereby when the lever is actuated the transmission brake will be applied with greater force than that of the front wheel brake.

2. In a motor vehicle, a crank case, an upper casing forming the upper part of a transmission housing and the crank case, a lever actuated transverse shaft journaled in said upper casing, a transversely extending member carried by said shaft, a transmission mechanism having a transmission brake, gearing connecting the transverse member to the transmission brake for actuating the latter from said shaft, and means actuated by the transverse member for operating front wheel brakes on the vehicle.

3. In a motor vehicle, a transmission housing, an upper casing forming the upper part of the engine crank casing and the transmission housing, a lever actuated shaft extending transversely and journalled in said upper casing, a transverse member coaxial with said shaft and carried by the latter, bevel pinions arranged on the shaft, one of said pinions being fixed to the transverse member and the other pinion being loosely mounted on the shaft, an arm fixed to the last mentioned pinion, planetary gearing connecting said pinions, and a transmission brake actuated by the transverse member, said arm being adapted to actuate front wheel brakes and the connected pinions functioning to exert different braking pressures on the transmission brake and on said arms.

4. In a motor vehicle having a transmission mechanism and a front wheel brake actuating member, a transmission brake, a rocking shaft, a lever adapted to be actuated by the operator for moving said shaft, a spider fixed to the shaft and carrying bevel pinions, sleeves loosely mounted on the shaft at opposite sides of the spider and having pinions meshing with the bevel pinions, a second shaft actuated by one of said sleeves for controlling the movement of the transmission brake, and a member connected to the other sleeve and adapted to actuate front wheel brakes of the vehicle.

In testimony whereof I have signed my name to this specification.

LOUIS RAPHAËL RAVEL.